(12) United States Patent
Shin et al.

(10) Patent No.: US 8,356,859 B2
(45) Date of Patent: Jan. 22, 2013

(54) REINFORCEMENT ASSEMBLY

(75) Inventors: Shoung-Gi Shin, Kyunggi-do (KR); Taehyun Lee, Kyunggi-do (KR); Daniel Rudolph, Boronia (AU); Mark Balazy, Lincoln Park, MI (US); Michael Flener, Pleasant Ridge, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 27 days.

(21) Appl. No.: 13/056,354

(22) PCT Filed: Jul. 29, 2009

(86) PCT No.: PCT/US2009/052068
§ 371 (c)(1),
(2), (4) Date: Jun. 22, 2011

(87) PCT Pub. No.: WO2010/014681
PCT Pub. Date: Feb. 4, 2010

(65) Prior Publication Data
US 2011/0241383 A1 Oct. 6, 2011

Related U.S. Application Data

(60) Provisional application No. 61/137,299, filed on Jul. 29, 2008.

(51) Int. Cl.
*B60N 99/00* (2006.01)
(52) U.S. Cl. ............... 296/193.05; 296/187.12
(58) Field of Classification Search ............ 296/187.03, 296/187.05, 187.12, 193.05, 193.06
See application file for complete search history.

(56) References Cited

U.S. PATENT DOCUMENTS

| | | | |
|---|---|---|---|
| 6,217,109 B1 | 4/2001 | Okana et al. | |
| 6,218,442 B1 | 4/2001 | Hilborn et al. | |
| 6,348,513 B1 | 2/2002 | Hilborn et al. | |
| 6,376,564 B1 | 4/2002 | Harrison | |
| 6,403,222 B1 | 6/2002 | Harrison | |
| 6,573,309 B1 | 6/2003 | Reitenbach et al. | |
| 6,607,238 B2 * | 8/2003 | Barz | 296/187.09 |
| 6,641,208 B2 * | 11/2003 | Czaplicki et al. | 296/187.02 |
| 6,786,533 B2 * | 9/2004 | Bock et al. | 296/187.02 |
| 7,296,847 B2 * | 11/2007 | Czaplicki et al. | 296/187.02 |
| 2003/0057737 A1 | 3/2003 | Bock et al. | |
| 2003/0183317 A1 | 10/2003 | Czaplicki et al. | |
| 2004/0266899 A1 | 12/2004 | Muenz et al. | |
| 2006/0209310 A1 | 9/2006 | Muenz et al. | |

FOREIGN PATENT DOCUMENTS

| | | |
|---|---|---|
| JP | 2000219150 A | 8/2000 |
| KR | 20020090414 A | 11/2003 |

OTHER PUBLICATIONS

PCT International Search Report Dated Feb. 16, 2010, Application No. PCT/US2009/052068, Henkel AG & Co. KGAA et al.

* cited by examiner

*Primary Examiner* — Lori Lyjak
(74) *Attorney, Agent, or Firm* — Mary K. Cameron (57) ABSTRACT

The present invention relates to a reinforcement assembly for a beam. In at least one embodiment, the reinforcement assembly comprises a carrier member having a front side and a back side, a plurality of mass support sections, and at least one bendable portion disposed between adjacent mass support sections. Each mass support section has an opening extending from the front side to the back side, and a plurality of heat activated expandable masses supported on both the front side and the back side of the carrier member. Each heat activated expandable mass is positioned over a mass support section and each heat activated expandable mass is disposed on the front side being connected through the opening to a corresponding heat activated expandable mass on the back side.

20 Claims, 12 Drawing Sheets

REINFORCEMENT ASSEMBLY

CROSS-REFERENCE TO RELATED APPLICATIONS

This application claims the benefit of U.S. provisional application Ser. No. 61/137,299 filed Jul. 29, 2008.

BACKGROUND

1. Field of the Invention

The field of the invention relates to reinforcement assemblies for reinforcing beams, pillars and the like.

2. Background Art

Reinforcement assemblies for reinforcing beams or pillars, such as an A, B or C pillar in a vehicle are well known. A typical A-pillar in an automobile includes an inner elongate member having a generally rectangular cross-section and an outer covering that fits over the inner rectangular member. Conventional reinforcement assemblies include a generally bracket shaped or C-shaped member that is configured to fit between the inner rectangular member and the outer C-shaped cover member. The conventional reinforcement member includes a heat activated expandable mass disposed on both sides of the reinforcement member. During heating, such as e-coat baking, the expandable mass reaches its activation temperature and activates. When the mass activates, it expands and becomes a foam that presses against both the inner rectangular member and the outer C-shaped cover member. The foam bonds with both members to rigidly fix the outer cover member to the inner rectangular member, thus substantially increasing the strength of the entire B-pillar. This increase in strength occurs without substantially increasing the weight of the B-pillar.

Because conventional reinforcement members are generally C-shaped or bracket-shaped, they are difficult to stack and/or densely pack in shipping crates and containers when being transported to an automobile manufacturer or other end user. As a result, shipping containers packed with conventional reinforcement members include a substantial amount of unutilized space, this unutilized space adds a considerable amount of shipping costs. It would be advantageous to maximize the use of shipping space and decrease the costs associated with shipping reinforcement assemblies.

SUMMARY

A reinforcement assembly for a beam is disclosed herein. In a first embodiment, the reinforcement assembly comprises a carrier member having a front side and a back side. The carrier member has a plurality of mass support sections and at least one bendable portion disposed between adjacent mass support sections. Each mass support section has an opening that extends from the front side to the back side. The reinforcement assembly also comprises a plurality of heat activated expandable masses supported on both the front side and the back side of the carrier member. Each heat activated expandable mass is positioned over a mass support section. Each heat activated expandable mass disposed on the front side is connected through the opening to a corresponding heat activated expandable mass on the back side.

In an implementation of the first embodiment, each bendable portion has a thickness that is less than a thickness of each adjacent mass support section.

In another implementation of the first embodiment, each heat activated expandable mass extends longitudinally along a respective one of the mass support sections for substantially an entire length of the respective one of the mass support sections.

In another implementation of the first embodiment, at least some of the mass support sections comprise a plurality of ribs.

In another implementation of the first embodiment, each bendable portion is sufficiently flexible to permit the adjacent mass support sections to bend approximately 45° with respect to one another. In a variation of this implementation, the bendable portion may be sufficiently flexible to permit the adjacent mass support sections to bend approximately 90° with respect to one another.

In another implementation of the first embodiment, the carrier member may comprise polypropylene. In a variation of this implementation, the polypropylene may be able to tolerate temperatures up to approximately 350° F. without substantial deterioration.

In another implementation of the first embodiment, the carrier member may comprise nylon.

In another implementation of the first embodiment, each heat activated expandable mass may be made of a material that expands 100% volumetrically when activated.

In a second embodiment, a reinforcement assembly for a beam includes an injection molded carrier member that is generally planar and has a front side and a back side. The carrier member has a plurality of mass support sections that extend longitudinally along the carrier member. The carrier member also includes a plurality of living hinges. Each living hinge is disposed between adjacent mass support sections. The reinforcement assembly further includes a plurality of heat activated expandable masses that are supported on both the front side and the back side of the carrier member and which are disposed adjacent the mass support sections.

In a third embodiment, a reinforced channel assembly is disclosed. The reinforced channel assembly includes a channel member, a cover member configured to engage the channel member, and a reinforcement subassembly. The reinforcement subassembly is disposed between the channel member and the cover member. The reinforcement subassembly includes a carrier member having a plurality of mass support sections and at least one bendable portion that is disposed between adjacent mass support sections. The reinforcement subassembly further has a plurality of heat activated expandable masses that are supported on both a front side and a back side of the carrier member. Each heat activated expandable mass is positioned over a mass support section. The heat activated expandable masses bond to a portion of the channel member and to a portion of the cover member subsequent to heat activation such that the channel member and the cover member are substantially immobilized with respect to one another by the activated masses.

In another embodiment, a method of making a reinforced channel assembly is disclosed. The method includes providing a channel member, a cover member that is configured to engage the channel member and a reinforcement subassembly having a carrier member that has a plurality of mass support sections and at least one bendable portion disposed between adjacent mass support sections and a plurality of heat activated expandable masses supported on a front side and a back side of each mass support section. The method further includes positioning the reinforcement subassembly adjacent the channel member, positioning the cover member adjacent the reinforcement subassembly, pressing the cover member against the reinforcement subassembly and over the channel member to cause the reinforcement subassembly to bend at the bendable portions around the channel member.

The method further includes activating the expandable masses to cause the expandable masses to bond to the channel and the cover member.

BRIEF DESCRIPTION OF THE DRAWINGS

The description herein makes reference to the accompanying drawings wherein like reference numerals refer to like parts throughout the several views, and in which.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

One problem associated with conventional reinforcement assemblies, as discussed above, is their inflexibility due to the shape of conventional C- or bracket-shaped cross-section. This configuration makes conventional reinforcements difficult to densely pack in a shipping container. The present invention addresses this problem in at least one embodiment by configuring the reinforcement assembly to have at least one bendable portion so that the various sections of the reinforcement assembly can flex, bend and/or fold with respect to one another. The reinforcement assembly of the present invention can be folded relatively flat for shipping which can permit a far greater packing density then is typically permitted by conventional reinforcement assemblies. Embodiments of the reinforcement assembly of the present invention may be folded into, or near, the conventional C-shaped cross-section for engaging and reinforcing compartments and channels such as the A, B and C pillars on a vehicle by virtue of the one or more flexible/bendable portions joining the various sections of the reinforcement assembly.

Conventional reinforcement assemblies include a carrier or substrate made of a polymeric or metal material and configured in the general shape of a bracket or C. The conventional substrate is generally completely covered by an expandable heat activated mastic that expands by some predetermined amount when an activation temperature is reached. The mastic material is generally inflexible in its pre-activated state. Accordingly, if the various sections of the conventional reinforcement assembly were bent with respect to one another as would be necessary to fold it flat, such deformation could damage the mastic or cause it to separate from the carrier. The act of bending the various sections of the conventional reinforcement assembly a second time to permit it to engage the pillar of the vehicle may cause further damage and/or separation of the mastic from a carrier. Such damage could result in poor adhesion between the reinforcement assembly and the pillar when the mastic material is thermally activated, among other problems. Accordingly, conventional reinforcement assemblies are deformed for either shipping purposes or assembly purposes.

In embodiments of the present invention, reinforcement assemblies include a carrier member having designated areas or sections for carrying the expandable heat activated mastic material. Disposed between these mastic carrying sections are portions of the carrier that are devoid of mastic material. Thus, the mastic carrying sections of the reinforcement assembly may be bent with respect to one another because the portions of the carrier that are devoid of mastic act as flexible, bending location, a weak point, a living hinge or the like. This allows the mastic carrying sections of the reinforcement assembly to bend with respect to one another without damaging or otherwise provoking mastic separation from the carrier. This allows the reinforcement assemblies to be folded flat or substantially flat to permit higher density packaging of the reinforcement assemblies thereby reducing the quantity of unutilized space in shipping containers. As a result, a far greater number of reinforcement assemblies may be packed into existing containers. The reinforcement assemblies may be bent into a C-shaped or bracket shaped configuration for assembly to a pillar with the bendable portions of the carrier flexing and bending, thus serving as hinges for adjacent mastic carrying sections of the reinforcement assembly. The principles discussed above may be better understood by reference to the patent figures accompanying this application and by the discussion set forth below.

Figure 1:
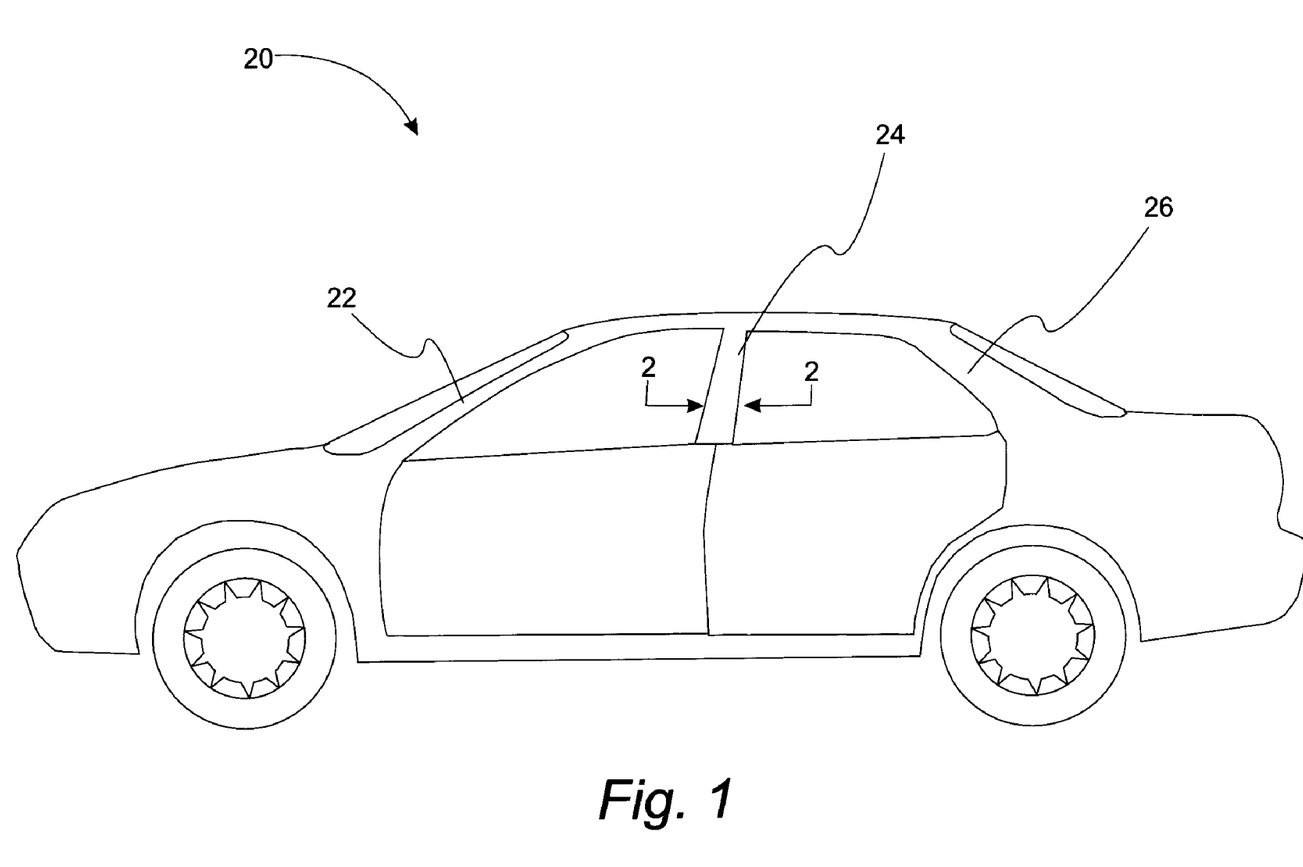
FIG. 1 is a schematic view illustrating an automobile having A, B and C pillars.

With respect to FIG. 1, a vehicle 20 is schematically illustrated. Although vehicle 20 is illustrated as a passenger car, it should be understood that the teachings of the present invention are equally applicable to all types of automobiles including, but not limited to sedans, coupes, convertibles, sport utility vehicles, cross over utility vehicles, light duty and heavy duty trucks, minivans, full size vans, and buses. Further, the teachings of the present invention are not limited to use with automobiles, but rather, may be employed with other vehicles as well including, but not limited to, aircraft, watercraft, spacecraft and other land craft such as rail driven vehicles. Furthermore, the teachings of the present invention are not limited for use with vehicles that may be used in any application where it is desirable to reinforce a hollow channel or even a solid elongate member.

Vehicle 20 includes an A pillar assembly 22, a B pillar assembly 24 and a C pillar assembly 26. In the illustrated embodiment, a reinforcement assembly has been assembled to B pillar assembly 24. A cross-section of B pillar 24 has been taken along the line 2-2 and is illustrated in FIG. 2.

Figure 2:
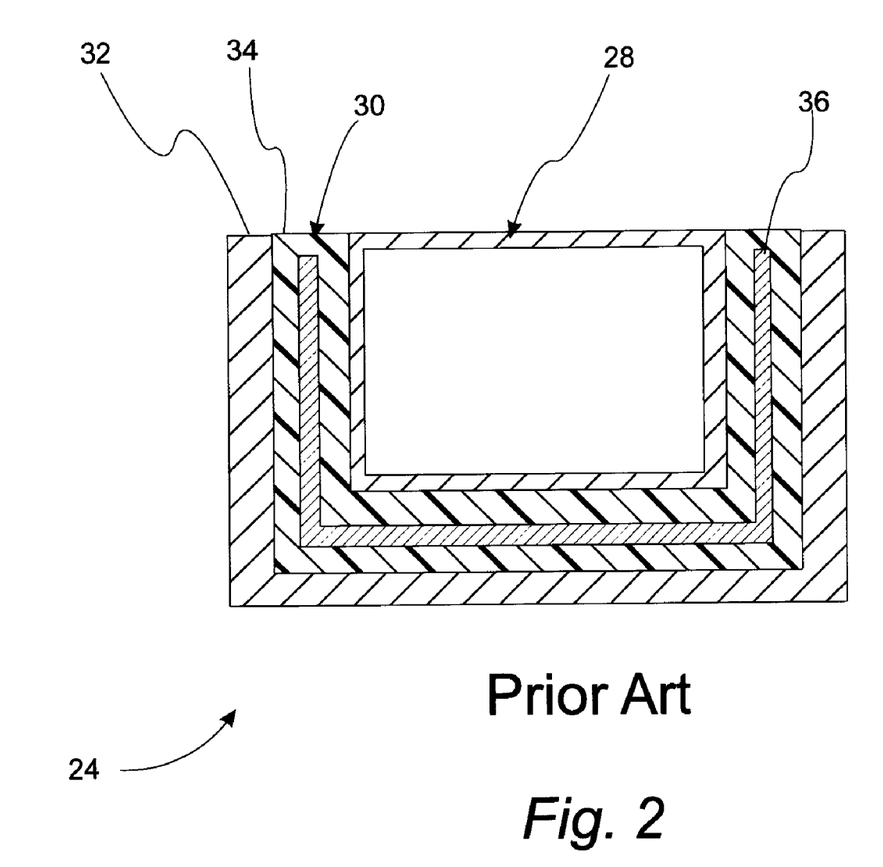
FIG. 2 is a cross-section of the B pillar of the vehicle of FIG. 1 having a prior art reinforcement assembly.
Figure 3:
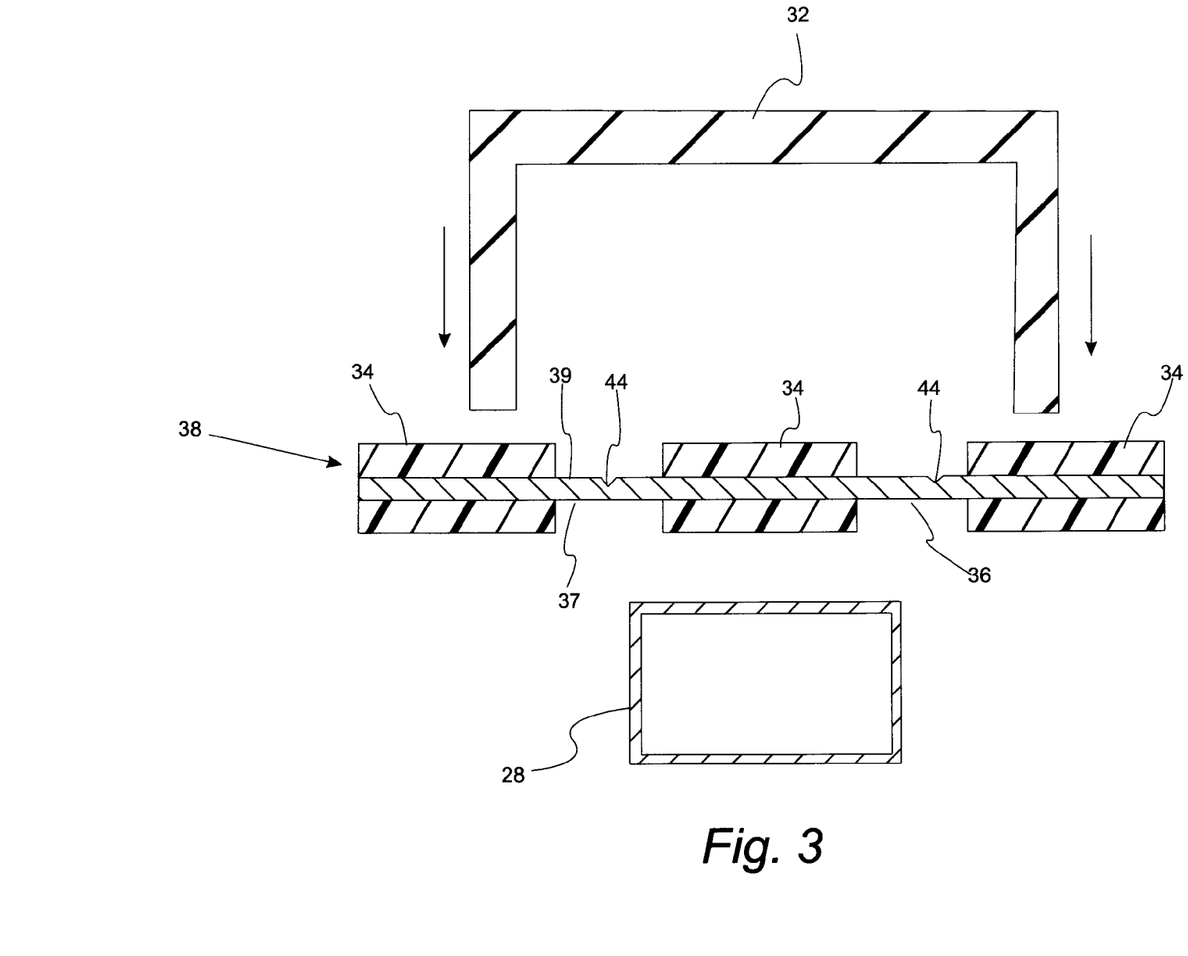
FIGS. 3-6 illustrate a process for making a reinforcement assembly in accordance with an embodiment of the present invention.

FIG. 2 illustrates a cross-section of B pillar assembly 24 which includes a beam or channel member 28, a prior art reinforcement assembly 30 and a cover member 32. Channel member 28 is generally rectangular in configuration, though in other applications, it may have any appropriate cross-section. Channel member 28 is hollow to provide space for the routing of seatbelts and other vehicle components. Channel member 28 may comprise steel or other suitable metals or metal alloys. Cover member 32 has a bracket-shaped or C-shaped cross-section and is configured to fit over channel member 28. Cover member 32 may be made of materials comprising steel and other suitable metals and metal alloys. Prior art reinforcement assembly 30 includes an expandable mass 34 and a carrier member 36. The expandable mass 34 comprises an epoxy based structural foam that expands upon thermal activation. When a predetermined activation energy is reached, the expandable mass expands, in some embodiments, by as much as 100% or 200% or even more, whereupon it contacts and bonds with cover member 32 and channel member 28. After expandable mass 34 has been thermally activated, it becomes substantially rigid having a high modulus of elasticity. Expandable mass 34 acts as an adhesive resiliently bonding cover member 32 to channel member 28. The resilient bonding of cover member 32 to channel member 28 has the effect of substantially increasing the strength of B pillar assembly 24, giving it substantially the same strength as a similarly dimensioned pillar made entirely of steel or other suitable metals or metal alloys, but having a lower weight.

Carrier member 36 serves as a substrate to support expandable mass 34 both before, during and after the thermal activation. Carrier member 36 may be made of materials including nylon, steel, aluminum, magnesium, polyamide, and high temperature polypropylene.

As set forth above, prior art reinforcement assembly 30 has the disadvantage of being substantially inflexible such that its various transverse sections are not capable of bending with respect to one another without causing damage/loss/separation of mastic material. In at least one embodiment, a reinforcement assembly 38, made in accordance with teachings of the present invention, (as best seen in FIG. 6) addresses this problem. In at least the embodiment illustrated in FIGS. 3-6, reinforcement assembly 38 includes carrier member 36 and a plurality of expandable masses 34. Carrier member 36 has a front 37 and a back 39 and includes a plurality of mass support sections 40 to support expandable mass 34. Disposed between each mass support section 40 are bendable portions 42 which permit the mass support sections 40 to bend with respect to one another. In at lest the illustrated embodiment, no expandable mass 34 is disposed over one or more of the bendable portions 42. However, it should be understood that in some embodiments, expandable mass 34 may be disposed over the bendable portions 42. In such embodiments, it may be desirable to keep such expandable mass relatively thin compared with the expandable mass 34 supported on the mass support sections 40. For instance, the thickness of the expandable masses 34 disposed on the mass support sections 40 are typically 1.0 to 10 mm, while the thickness of any expandable mass on the bendable portions 42 is typically less than 0.5 mm, and more typically 0.01 to 0.25 mm.

Carrier member 36 may be made of any high heat resistant polypropylene including, but not limited to, nylon, aluminum, steel, magnesium, polyamide, and high temperature polypropylene. Additionally, any material which does not substantially deform at temperatures up to 250° F. and which has enough ductility to bend at the hinge may also be used. As used in this application, the term "high heat" refers to temperatures of 350° F. or above. In some embodiments, carrier member 36 may be manufactured using the process of injection molding. In some embodiments, the bendable portions 42 may be molded to be thinner than the adjacent mass support sections 40. In these embodiments, the bendable portions 42 may have a thickness of 1.0 to 50 mm while the mass support sections may have a thickness of 0.5 to 5 mm. In other embodiments, a notch 44 (see FIG. 3) may be cut out of carrier member 36 to provide carrier member 36 with a predetermined weak point to define the areas where bending will occur. In other embodiments, any other suitable method for weakening the carrier may be employed.

The composition of the expandable mass is not particularly limited, as long as it has the property of foaming and expanding by application of external heating, e.g., at about 140 to 210° C. (the typical temperatures encountered by an automobile body in the electrodeposition or baked finish process for an automobile) and can be formed into a solid shape. In a preferred embodiment, the composition used to perform the expandable mass is selected such that the composition is solid and dimensionally stable at room temperature, but capable of being sufficiently softened when heated to an elevated temperature such that the composition can be molded (by injection molding, for example) into the desired shape and form (the elevated temperature being below the temperature required to activate and foam the composition). Preferably, the expandable mass is comprised of at least one resin (e.g., a thermoplastic or thermosettable resin) and at least one latent foaming agent (e.g., a foaming agent that is stable at room temperature but is activated upon application of heat, such as latent chemical foaming agents as well as encapsulated physical blowing agents). Various heat-activated foamable materials such as mixtures of urethane-, epoxy-, rubber-, or olefin-based heat-foaming materials, fillers (including low density fillers such as hollow glass microspheres), and/or heat activated curing or crosslinking agents can be used, and specific examples of such foamable materials include those disclosed in U.S. Pat. Nos. 6,573,309; 6,403,222; 6,348,513; 6,218,442; and 6,376,564, as well as United States Pat. Publication Nos. 2006-0209310 and 2004-0266899, each of which is incorporated herein by reference in its entirety. Suitable foamable materials are also available commercially, such as, for example, the TEROCORE products sold by Henkel AG & Co. KGaA and its affiliates.

Figure 4:
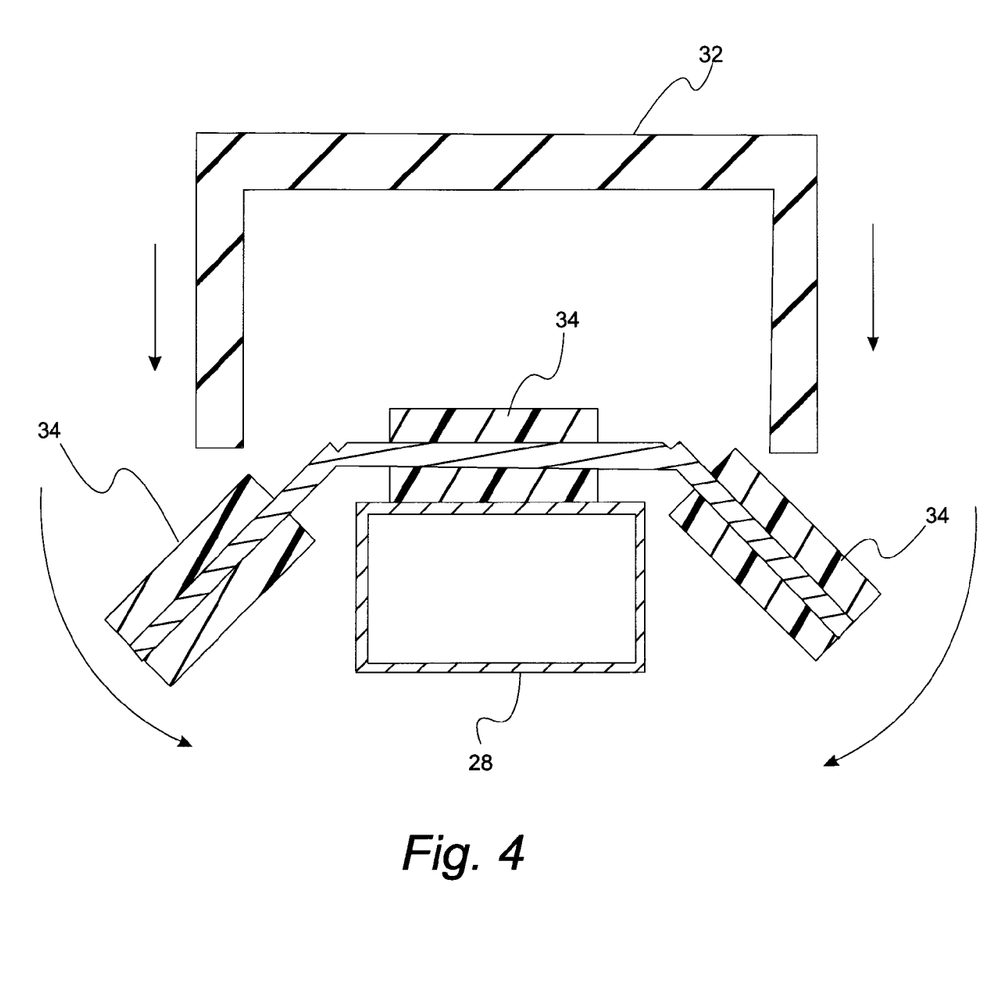

An exemplary process of making B pillar assembly 24 (or any other reinforced channel) is illustrated in FIGS. 3-6. With respect to FIG. 3, reinforcement assembly 38 is positioned adjacent channel member 28. Cover member 32 is positioned adjacent reinforcement assembly 38 and disposed on a side of reinforcement assembly 38 that is opposite to channel member 28. Cover member 32 is then pressed in a direction towards channel member 28. FIG. 4 illustrates the action of cover member 32 contacting expandable masses 34 and causing the outboard expandable masses 34 to bend with respect to the centrally located expandable masses 34 such that the reinforcement assembly 38 wraps around channel member 28.

Figure 5:
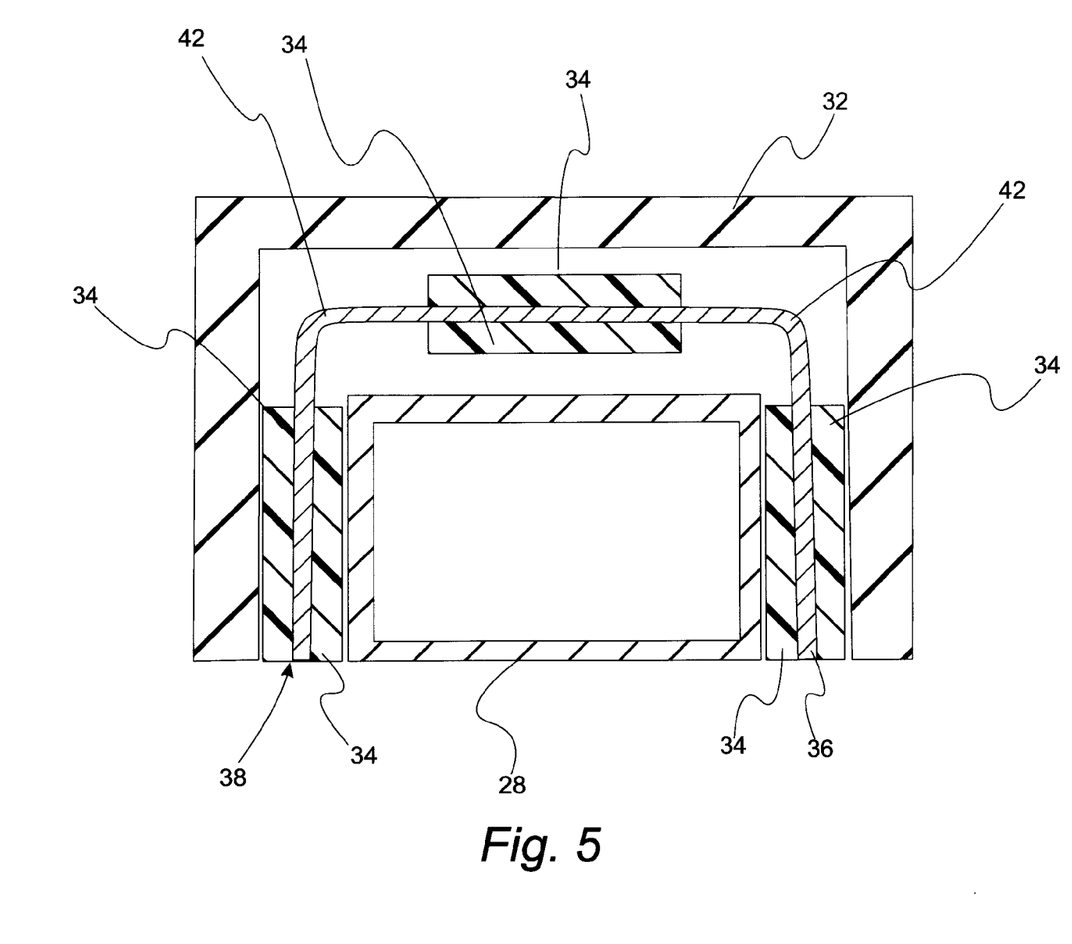
Figure 6:
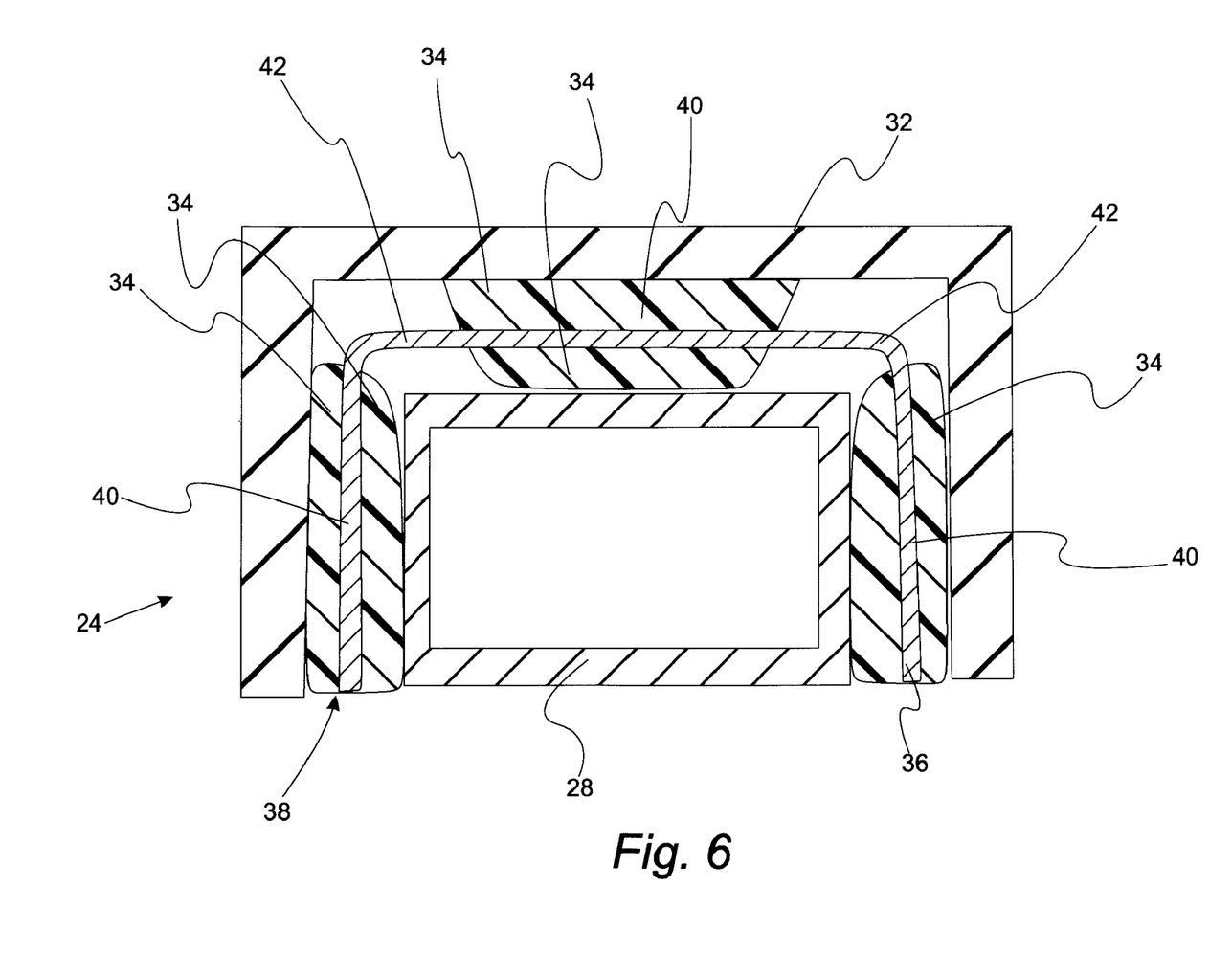

With respect to FIG. 5, cover member 32 has been pressed into position around channel member 28 and reinforcement assembly 38 is sandwiched between cover member 32 and channel member 28. Having bendable portions 42 provides a defined bending area for the various mass support sections 40 and inhibits carrier member 36 from bending in other areas.

With respect to FIG. 6, after the loosely assembled B pillar 24 illustrated in FIG. 5 is heated to a temperature at or above the thermal activation temperature of expandable mass 34, expandable mass 34 activates and expands into a foam. Expandable mass 34 may expand by as much as 100%, 200% or more during thermal activation, thereby filling some of the voids and empty spaces of the loose assembly. Expandable mass 34, when activated, is capable of bonding to cover member 32 and also to channel member 28. Once expandable mass 34's thermal activation is complete, cover member 32 is resiliently bonded to channel member 24, which greatly enhances the strength and rigidity of B pillar assembly 24.

Figure 7:
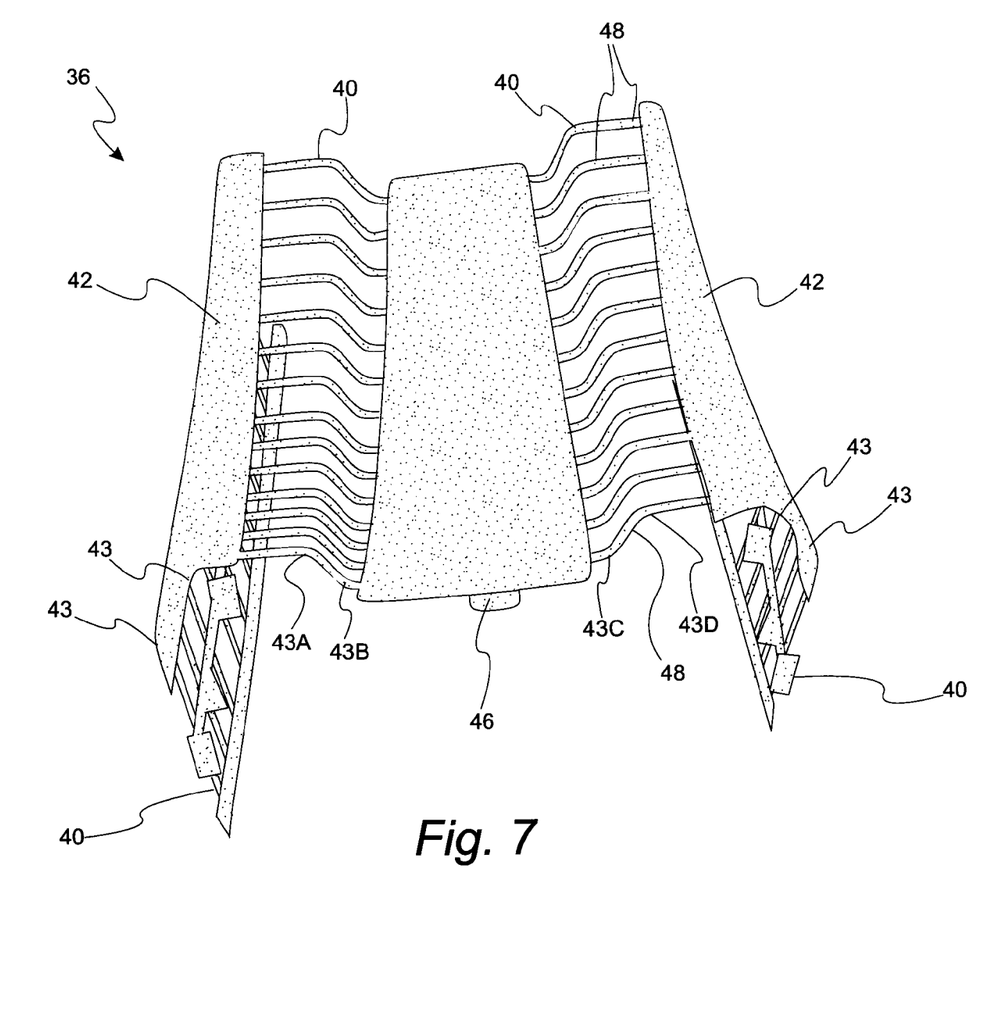
FIG. 7 illustrates a carrier member for use with an embodiment of the reinforcement assembly of the present invention.

With respect to FIG. 7, a perspective view of an alternate embodiment of carrier member 36 is illustrated. In the illustrated embodiment, carrier member 36 includes a plurality of mass support sections 40 and two bendable portions 42. As indicated in the illustration, carrier member 36 includes a plurality of molded hinges 43. Four of the molded hinges 43 are disposed in the two bendable portions 42, two in each of the bendable portions. The molded hinges 43 identified sequentially as A, B, C and D are positioned within the mass support sections 40. Molded hinges A, B, C, and D permit manipulation of mass support sections 40 into a plurality of different desirable configurations as required by the specific application prior to the affixing of expandable mass 34 to mass support sections 40. For instance, in certain embodiments, bendable portions 42 can be sufficiently flexible to permit adjacent mass support sections 40 to bend 15° to 180° relative to each other, in other embodiments 30° to 120° relative to each other, and in yet other embodiments 45° to 90° each other. In the configuration illustrated in FIGS. 8-11, mass support sections 40 have an approximately 110° bend through their respective centers. This may be desirable to facilitate the stacking of carrier members 36 one on top of another. In other applications, it may be desirable to have substantially flat mass support sections 40.

After the carrier member 36 is molded or otherwise produced, expandable mass 34 are affixed to carrier member 36 through any method effective to affix the mastic to the carrier including insert molding the mastic about the carrier. In some embodiments, expandable mass 34 may be over molded onto carrier member 36. Alternatively, mechanical means such as clips, brackets, pins and the like could also be used. In some embodiments, adhesives may be used to adhere expandable mass 34 to carrier member 36. In still other embodiments, expandable mass 34 may be formulated so that it is tacky enough to stick to a surface of carrier member 36. As illustrated in FIG. 7, each mass support section 40 has one or more openings extending from the front side to the back side to allow the heat activated expandable mass 34 disposed on the front of the mass support section to be connected to a corresponding heat activated expandable mass 34 disposed on the back side.

The configuration of carrier member 36 may be molded to accommodate any cross-sectional geometry of a channel member and a cover member. In the embodiment of carrier member 36 illustrated in FIG. 7, bendable portions 42 are molded to have a smaller thickness than the adjacent mass support sections 40. In these embodiments, the bendable portions 42 have a thickness of 0.5 to 5 mm and the mass support sections have a thickness of 1.0 to 50. In other embodiments, the thickness throughout the cross-section of carrier member 36 may be substantially uniform and the bendable portions may have notches or layers of material removed such as by milling. Carrier member 36 may also include a plurality of clips 46 which permit reinforcement assembly 38 to be loosely assembled to channel member 28 and generally held in place before cover member 32 is pushed into position around reinforcement assembly 38 and channel member 28.

Carrier member 36, as illustrated in FIG. 7, includes a plurality of ribs 48. In this embodiment, the ribs 48 are present in the mass support sections 40. This permits the expandable mass 34 on one side of carrier member 36 to bond to the expandable mass 34 on the opposite side of carrier member 36. In at least one embodiment, ribs 48 are 1.0 to 50 mm thick, 5 to 50 mm long, and 5 to 100 mm spaced apart. In at least one embodiment, mass support sections 40 are 100 mm to 1.0 m (meter) long and include 10 to 100 ribs. In other embodiments, rather than having ribs 48 at mass support sections 40, carrier member 36 may comprise mesh. The use of ribs and mesh may be advantageous by allowing the use of less material in reinforcement assembly 38 resulting in lower costs of production. In still other embodiments, rather than molding carrier member 36 with ribs 48, carrier member 36 may have a plurality of planar members serving as mass support sections. In such embodiments, a slot, a hole or a plurality of holes would need to be defined in the planar surface of carrier member 36 at various locations to enable the expandable mass on opposite sides of the carrier member to bond to one another. This may be necessary to structurally reinforce B pillar assembly 24.

Figure 8:
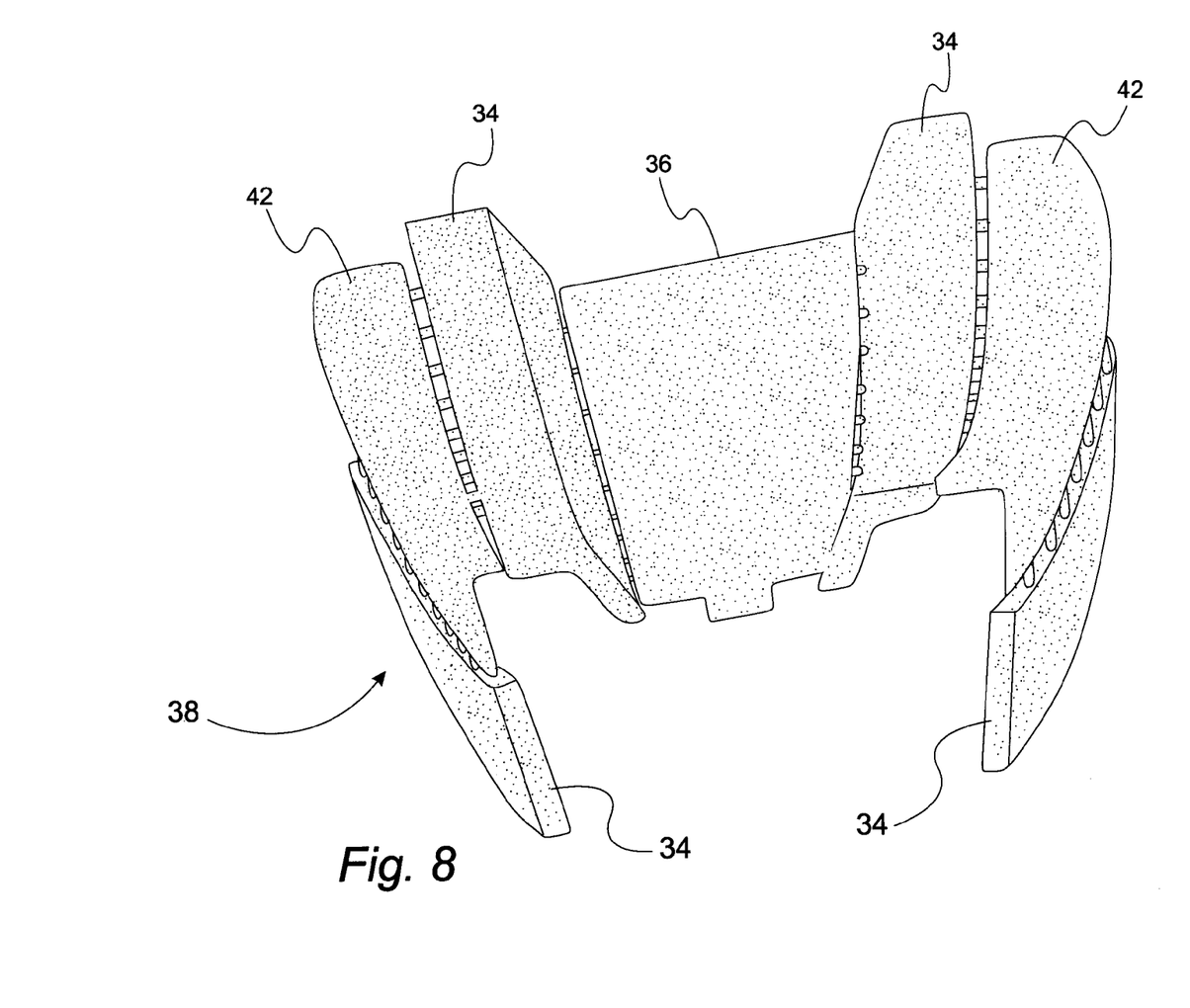
FIGS. 8-9 illustrate a reinforcement assembly made in accordance with an embodiment of the present invention in various orientations.
Figure 9:
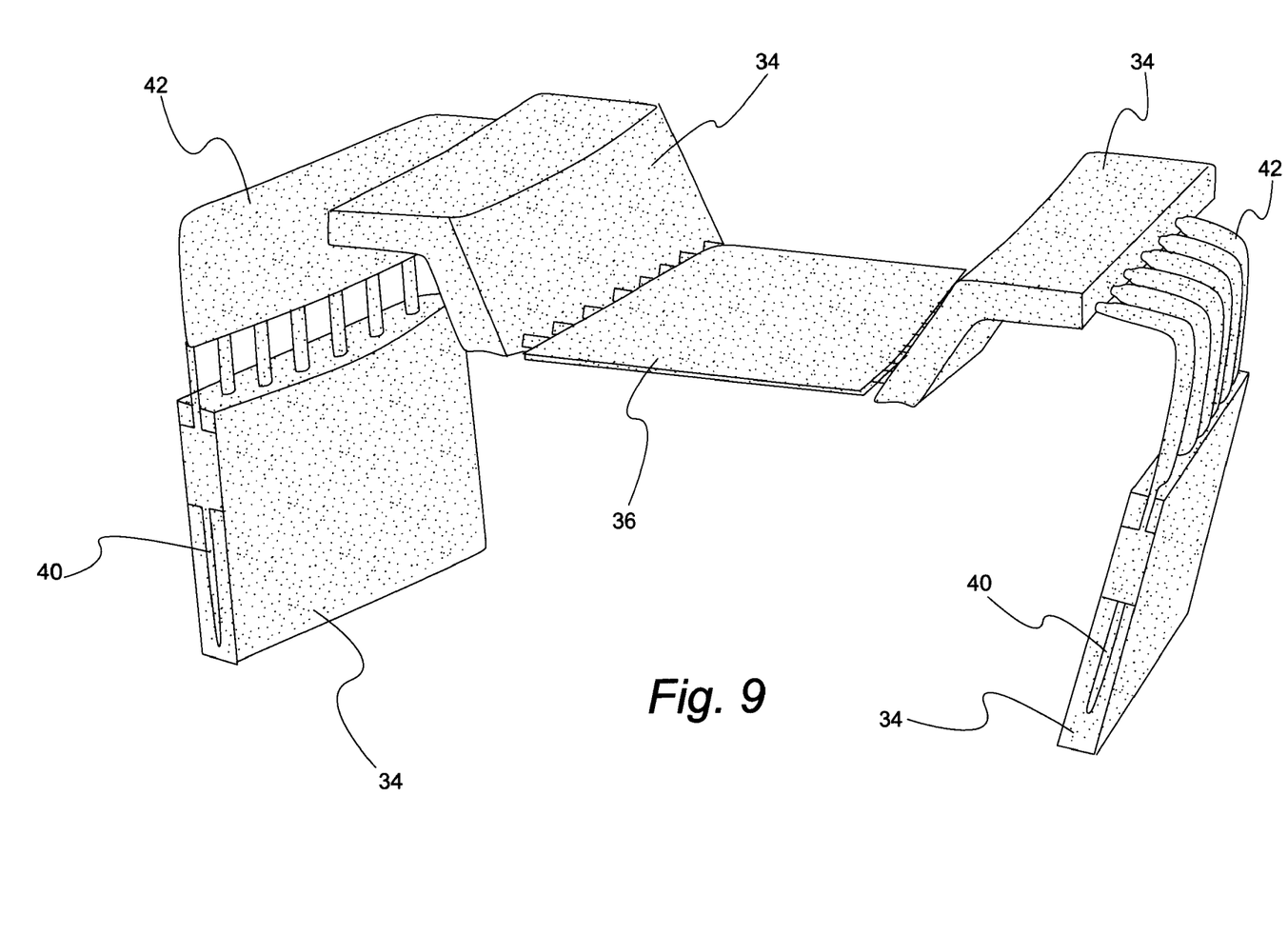

FIGS. 8-9 illustrate reinforcement assembly 38, including carrier member 36 and expandable mass 34 shown in various orientations.

Figure 10:
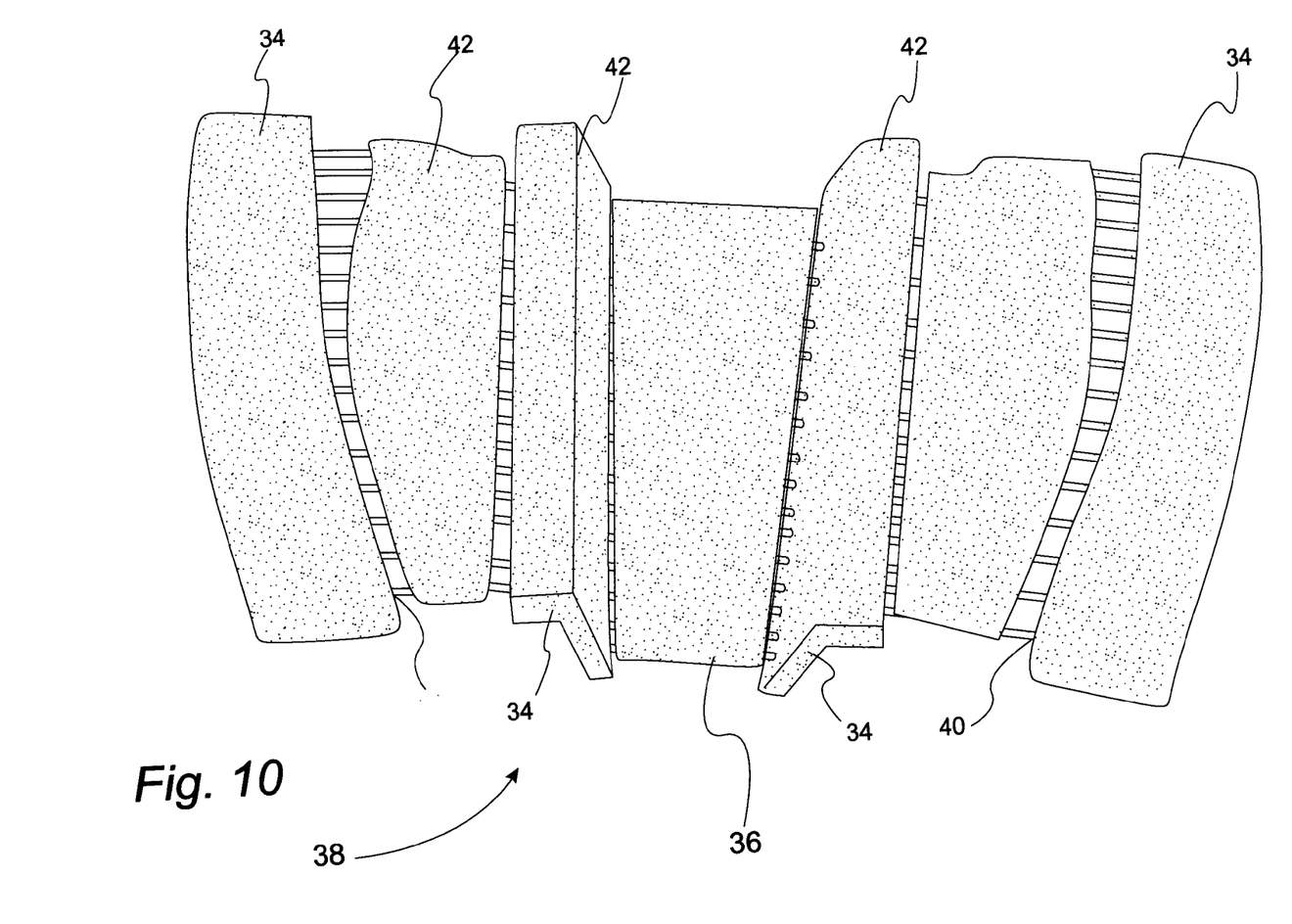
FIG. 10 illustrates the reinforcement assembly of FIGS. 8-9 folded substantially flat.

FIG. 10 illustrates the reinforcement assembly 38 of FIGS. 8-9 in a generally flat configuration. Carrier member 36 may be molded or manufactured such that it is generally flat in its natural (pre-stressed) condition and then bent to engage a channel member 28. Alternatively, carrier member 36 may be molded such that it has a C-shaped or bracket shaped cross-section in its natural state and then bent into a generally flat configuration for packaging. Alternatively, carrier member 36 may take any other shape in its natural condition and deformed as desired.

Figure 11:
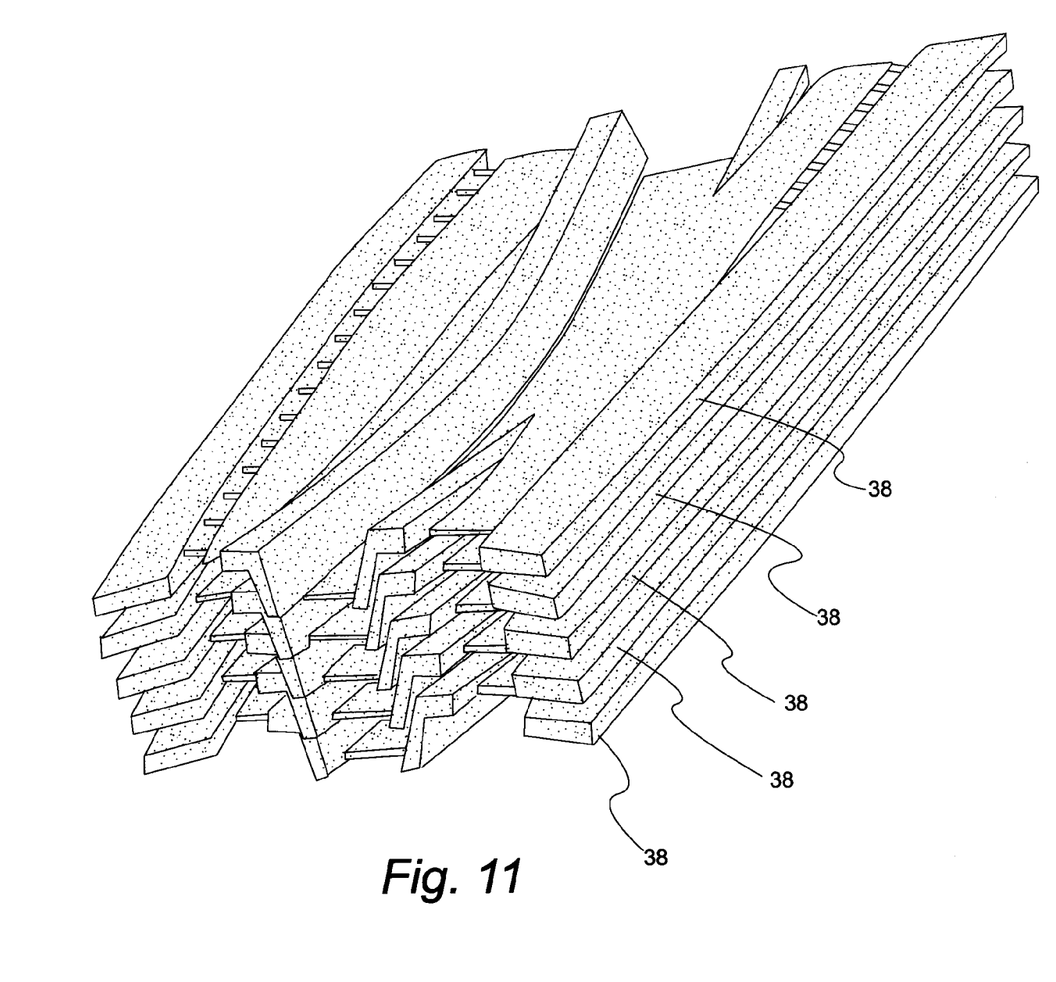
FIGS. 11-12 illustrate a plurality of the reinforcement assembly of FIG. 10 stacked on top of one another to illustrate an exemplary packing/shipping configuration.
Figure 12:
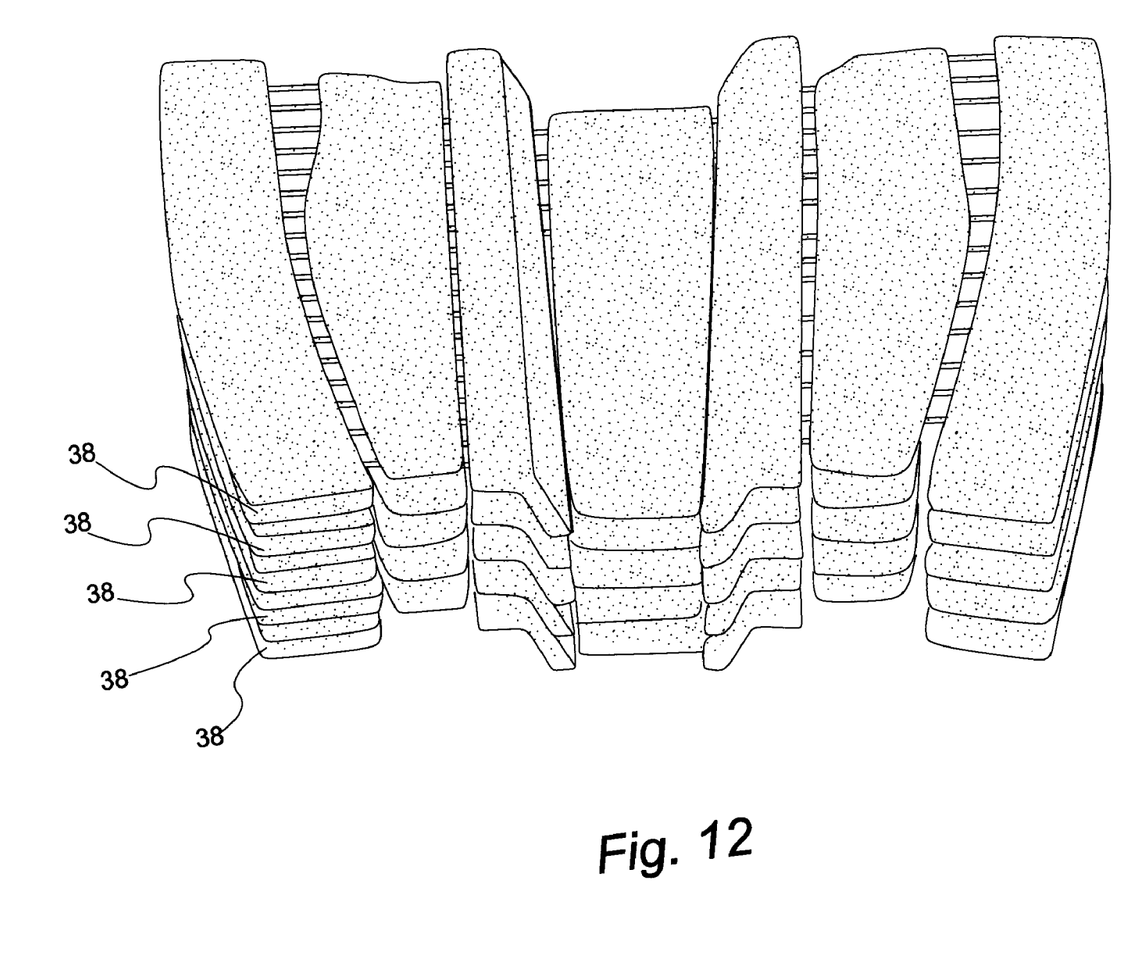

FIGS. 11 and 12 illustrate a plurality of reinforcement assemblies 38 nested on top of one another in a generally flat configuration for packing into a shipping container.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A reinforcement assembly for a beam, the reinforcement assembly comprising:
    a carrier member having a front side and a back side, the carrier member having a plurality of mass support sections and at least one bendable portion disposed between adjacent mass support sections, each mass support section having an opening extending from the front side to the back side; and
    a plurality of heat activated expandable masses supported on both the front side and the back side of the carrier member, each heat activated expandable mass being positioned over a mass support section and each heat activated expandable mass disposed on the front side being connected through the opening to a corresponding heat activated expandable mass on the back side.

2. The reinforcement assembly of claim 1 wherein each bendable portion has a thickness that is less than a thickness of each adjacent mass support section.

3. The reinforcement assembly of claim 1 wherein each heat activated expandable mass extends longitudinally along a respective one of the mass support sections for substantially an entire length of the respective one of the mass support sections.

4. The reinforcement assembly of claim 1 wherein at least some of the mass support sections comprise a plurality of ribs.

5. The reinforcement assembly of claim 1 wherein each bendable portion is sufficiently flexible to permit the adjacent mass support sections to bend approximately 45° with respect to one another.

6. The reinforcement assembly of claim 1 wherein the bendable portion is sufficiently flexible to permit the adjacent mass support sections to bend approximately 90° with respect to one another.

7. The reinforcement assembly of claim 1 wherein the carrier member comprises polypropylene.

8. The reinforcement assembly of claim 7 wherein the polypropylene can tolerate temperatures up to approximately 250° F. without substantial deterioration.

9. The reinforcement assembly of claim 1 wherein the carrier member comprises nylon.

10. The reinforcement assembly of claim 1 wherein each heat activated expandable mass is made of a material that expands 100% volumetrically when activated.

11. The reinforcement assembly of claim 1 wherein the at least one bendable portion is substantially devoid of heat activated expandable mass.

12. The reinforcement assembly of claim 1 wherein the at least one bendable portion is devoid of heat activated expandable mass.

13. The reinforcement assembly of claim 1 wherein each bendable portion is sufficiently flexible to permit the adjacent mass support sections to bend 30° to 120° with respect to one another.

14. A reinforcement assembly for a beam, the reinforcement assembly comprising:
an injection molded carrier member being generally planar and having a front side and a back side, the carrier member being divided into a plurality of mass support sections extending longitudinally along the carrier member, and a plurality of living hinges, each living hinge being disposed between adjacent mass support sections; and
a plurality of heat activated expandable masses supported on both the front side and the back side of the carrier member and disposed adjacent the mass support sections.

15. The reinforcement assembly of claim 14 wherein at least one living hinge is devoid of heat activated expandable masses.

16. A reinforced channel assembly comprising:
a channel member;
a cover member configured to engage the channel member; and
a reinforcement subassembly disposed between the channel member and the cover member, the reinforcement subassembly having:
a carrier member having a plurality of mass support sections and at least one bendable portion disposed between adjacent mass support sections; and
a plurality of heat activated expandable masses supported on both a front side and a back side of the carrier member, each heat activated expandable mass being positioned over a mass support section,
wherein the heat activated expandable masses bond to a portion of the channel member and a portion of the cover member subsequent to heat activation such that the channel member and the cover member are substantially immobilized with respect to one another by the activated masses.

17. The reinforced channel assembly of claim 16 wherein each bendable portion has a thickness that is less than a thickness of each adjacent mass support section.

18. The reinforced channel assembly of claim 16 wherein at least some of the mass support sections comprise a plurality of ribs.

19. A method of making a reinforced channel assembly comprising:
providing a channel member, a cover member that is configured to engage the channel member and a reinforcement subassembly having a carrier member having a plurality of mass support sections and at least one bendable portion disposed between adjacent mass support sections and a plurality of heat activated expandable masses supported on a front side and a back side of the mass support sections;
positioning the reinforcement subassembly adjacent the channel member;
positioning the cover member adjacent the reinforcement subassembly;
pressing the cover member against the reinforcement subassembly and over the channel member to cause the reinforcement subassembly to bend at the bendable portion around the channel member; and
activating the expandable masses to cause the expandable masses to bond to the channel member and the cover member.

20. The method of making a reinforced channel assembly of claim 19 wherein the at least one bendable portion is devoid of heat activated expandable mass.

* * * * *